United States Patent [19]

Uhrich

[11] 3,987,708
[45] Oct. 26, 1976

[54] DEPTH INSENSITIVE ACCUMULATOR FOR UNDERSEA HYDRAULIC SYSTEMS

[75] Inventor: Richard Uhrich, San Diego, Calif.

[73] Assignee: The United States of America as represented by the Secretary of the Navy, Washington, D.C.

[22] Filed: Mar. 10, 1975

[21] Appl. No.: 556,604

[52] U.S. Cl. .................................. 92/134; 60/413; 138/31
[51] Int. Cl.² .................. F16L 55/00; F01B 25/02; F01B 31/00
[58] Field of Search .................. 138/31, 30; 60/413, 60/398; 92/134

[56] References Cited
UNITED STATES PATENTS

| | | | |
|---|---|---|---|
| 2,721,446 | 10/1955 | Bumb | 138/31 X |
| 3,436,914 | 4/1969 | Rosfelder | 60/398 |
| 3,750,404 | 8/1973 | Murman et al. | 60/413 |

Primary Examiner—Richard E. Aegerter
Assistant Examiner—Michael H. Thaler
Attorney, Agent, or Firm—Richard S. Sciascia; Ervin F. Johnston; William T. Skeer

[57] ABSTRACT

An underwater hydraulic pressure regulator includes an ambient pressure responsive cylinder and a regulator cylinder which are each fitted with integrally coupled pistons. The ambient pressure cylinder, as the name implies, is opened to ambient pressure by suitable ducting. The ambient pressure works against a volume of low pressure gas on the other side of a piston contained in the ambient pressure cylinder which in turn displaces the piston within the regulator cylinder. The back of the regulator cylinder is in communication with a conventional gas accumulator such that the restortative force on the back face of the second piston is influenced by both the ambient pressure and the gas accumulator pressure.

2 Claims, 2 Drawing Figures

DEPTH INSENSITIVE ACCUMULATOR FOR UNDERSEA HYDRAULIC SYSTEMS

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to marine engineering. More particularly, this invention pertains to marine applications of hydraulic control. In still greater particularity, this invention pertains to the use of hydraulic control mechanisms in underwater environments. In still greater particularity this invention pertains to an underwater hydraulic pressure regulator. By way of further characterization, but without limitation thereto, this invention pertains to a pressure regulator for underwater hydraulic systems which is self-compensating for changes in ambient water pressure.

DESCRIPTION OF THE PRIOR ART

Hydraulic systems are well suited and commonly employed in performing work in high pressure undersea environment. For such applications, however, the low pressure portion of the system is maintained at the ambient pressure. The high pressure fluid is then at ambient plus working pressure. At great depths the air in a conventional gas accumulator becomes so compressed as to be incapable of adequate energy storage. In such systems, the hydraulic pump and pump motor must be capable of providing energy at the peak expected rate which may be many times the average pressure required for operation of the hydraulic tools. The acquisition and maintenance of such high energy pumps and pump motors are undesirable in small oceanographic and emergency recovery underwater vehicles.

Prior art attempts to overcome these limitations have sometimes employed a mechanical energy storage system. While satisfactory for single demand situations, such mechanical energy storage systems have not proven completely satisfactory for extended period underwater operations in which such vehicles are commonly employed. As an example of the problems, it is informative to reflect that a spring type mechanical system necessary to provide one horsepower for 1 minute requires an exceedingly large and cumbersome mechanical spring system. Such a spring having a 5,000 pound compressional force would be required to be compressed nearly seven feet to provide the necessary power. By comparison, a gas accumulator charged to 3,500 psi could store the same energy in approximately 2 liters of fluid.

SUMMARY OF THE INVENTION

The regulator according to the invention overcomes these prior art difficulties by having two cylinders each containing a piston such that four compartments are provided within the two cylinders. Each piston is rigidly coupled to the other such that movement of one piston effects a corresponding movement of the other. One cylinder has a trapped volume of low pressure gas on one side of the piston and an opening to the ambient underwater pressure of the other. Thus, as the ambient pressure increases this piston is forced to move in the cylinder compressing the volume of low pressure gas. A rigid link couples this piston movement to a second piston in the second cylinder which is exposed to the restorative pressure of a conventional gas accumulator on one side and the high pressure hydraulic fluid system on the other. Thus, the restorative pressure effected by the second piston is equal to the ambient pressure plus the gas accumulator pressure.

STATEMENT OF THE OBJECTS OF INVENTION

It is accordingly an object of this invention to provide an improved underwater hydraulic regulator.

A further object of this invention is to provide an underwater hydraulic regulator having a gas accumulator.

A still further object of this invention is to provide an underwater hydraulic regulator having a regulation pressure equal to that of a gas accumulator plus the ambient ocean pressure.

Another object of this invention is to provide an underwater hydraulic regulator having a plurality of cylinders and pistons.

Yet another object of this invention is to provide an underwater hydraulic regulator which requires no valves or mechanical pumps.

Other objects and many of the attendant advantages will be readily appreciated as the subject of the invention becomes better understood by reference to the following detailed description when considered in conjunction with the accompanying drawings.

DESCRIPTION OF THE PREFERRED EMBODIMENT

Figure 1:
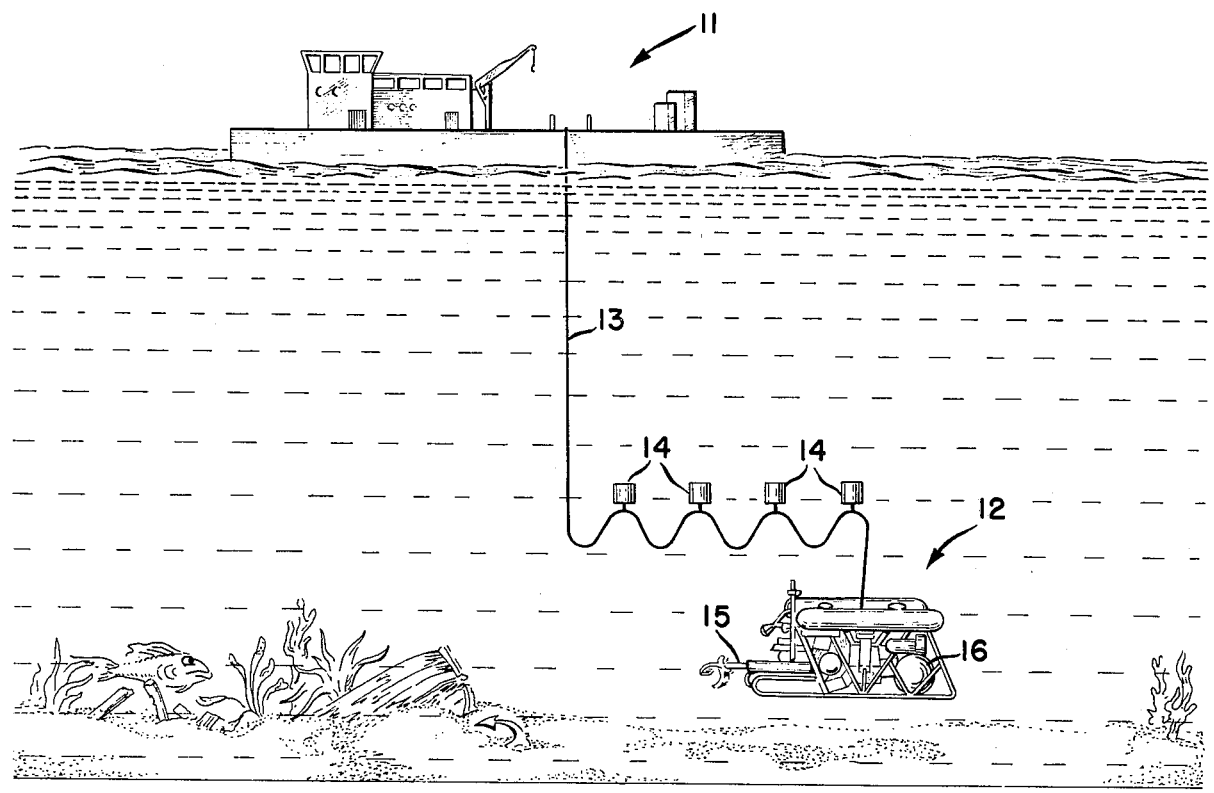
FIG. 1 is a perspective view showing the operational environment of the invention.

Referring to FIG. 1, the perspective view of the environmental surroundings of the invention will be described. An oceanographic vessel 11 serves as a support station for a submersible oceanographic vehicle 12. Oceanographic vehicle 12 may be of any known type and, for example, may be the vehicle known as CURV III.

Control and instrumentation connection between oceanographic vessel 11 and submersible vehicle 12 is made by an umbilical tether 13. As is conventional in the art, tether 13 may be buoyantly supported by a plurality of floats 14 to prevent fouling of the tether by submersible vehicle 12 as it maneuvers within the ocean depths.

Submersible vehicle 12 carries as component parts thereof hydraulically operated tools such as a manipulator arm 15. Manipulator arm 15 may be of any conventional hydraulically operated type and, for example, may be that described in U.S. Pat. No. 3,703,968 issued on Nov. 28, 1972 to Richard W. Uhrich, et al. for "Linear Linkage Manipulator Arm". The hydraulic power supply for manipulator arm 15 is housed in a suitable compartment 16 on oceanographic vehicle 12.

The hydraulic power supply may be of any conventional underwater hydraulic power source and in general comprises a fluid reservoir, a high speed underwater hydraulic pump and associated valving and conduits to the various hydraulically operated implements on oceanographic submersible 12. Housing 16 also encloses the hydraulic regulator of the invention.

Figure 2:
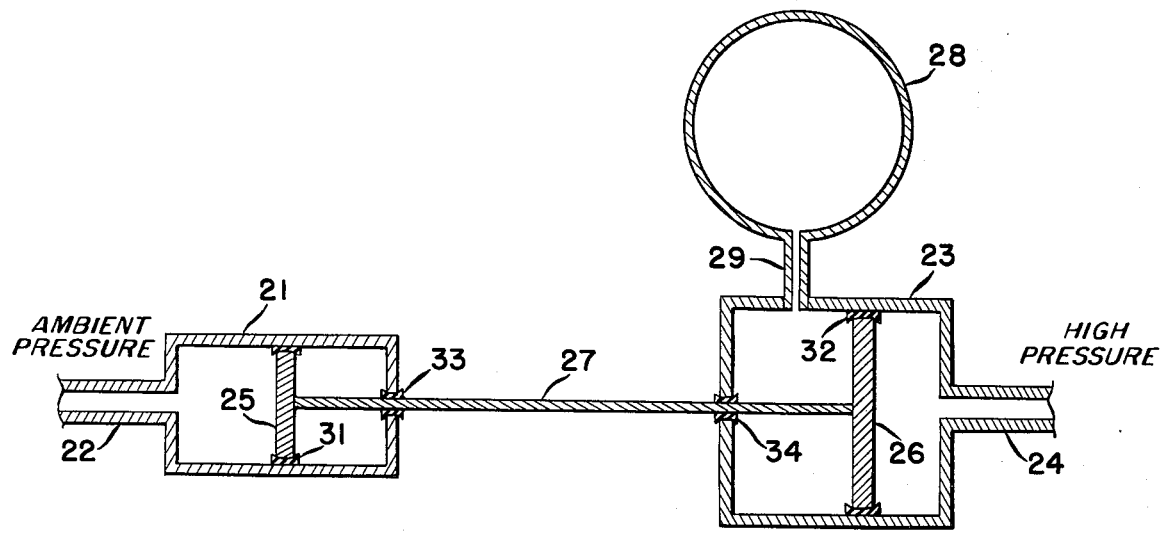
FIG. 2 is a sectional-schematic representation of the hydraulic regulator of the invention.

Referring to FIG. 2, a diagrammatic representation of the regulator of the invention is shown. Ambient pressure cylinder 21 has a duct means, such as manifold 22, connecting the interior thereof to the exterior ambient pressure. A second cylinder 23 has suitable conduit means, such as the illustrated tubing section 24, connecting the interior thereof to the high pressure portion of the hydraulic power supply system. A piston 25 is slidably housed within the ambient pressure, or first cylinder, 21 and divides it into two compartments. Similarly, a second piston 26 is slidably housed within second cylinder 23 to divide it into two compartments. First piston 25 is connected to second piston 26 by means of a rigid linkage 27. Rigid linkage 27 may comprise, for example, a cylindrical steel rod.

Thus, it may be seen, that the movement of first piston 25 is accompanied by a corresponding and equal linear movement of second piston 26.

A conventional gas accumulator 28 is connected to second cylinder 23 by means of suitable conduit means 29, which may be a suitably dimensioned length of tubing. First piston 25 is fluidly sealed within first cylinder 21 by means of conventional fluid-tight gasket 31. Similarly, second piston 26 carries a conventional hydraulic seal 32 to provide a fluid-tight fit with respect to second cylinder 23. As is conventional in the hydraulic control arts, the passage of rigid linkage 27 through the cylinder walls of first cylinder 21 and second cylinder 23 are sealed by conventional seals 33 and 34 respectively.

The portion of first cylinder 21 enclosed by piston 25 which is not in communication with the ambient pressure is filled with the low pressure gas such as atmospheric gas at one atmosphere pressure. Thus, the movement of piston 25 under the influence of the ambient pressure working against the low pressure volume of gas causes the displacement of first piston 25 within first cylinder 21. This linear movement is coupled via rigid linkage 27 to second piston 26 which, in turn, exerts a pressure upon the high pressure working fluid in the well understood operational principles of hydraulic systems. Similarly, the pressure accumulation within gas accumulator 28 also exerts a pressure on the same side and in the same direction as the coupled ambient pressure such that the high pressure hydraulic fluid is pressurized with the pressure of gas accumulator 28 plus the ambient pressure.

Thus, it may be seen that the pressure within gas accumulator 28 is always available in an undiminished fashion to the regulator portion comprising second cylinder 23 and second piston 26 such that short duration instantaneous demands may be conveniently met with a dependability which is independent of operational depth.

Of course, suitable modifications and rearrangements of the components of the invention will suggest themselves to those practiced in the marine engineering and hydraulic control arts. For example, first cylinder 21 and second cylinder 23 may be cast in a single unit thus shortening rigid linkage 27 and possibly eliminating one seal. Alternatively, first cylinder 21 and second cylinder 23 may be positioned such that their axes are not coaxial in which case, rigid linkage 27 would be other than the illustrated straight rod. Further, seal 33 may be dispensed with by positioning first cylinder 21 such that rigid linkage 27 extends through manifold 22 rather than through a wall of first cylinder 21. Naturally, in this arrangement first cylinder 21 would have a solid rear wall to contain the low pressure gas.

The foregoing description taken together with the appended claims constitute a disclosure such as to enable a person skilled in the marine engineering and hydraulic control arts and having the benefit of the teachings contained therein to make and use the invention. Further, structure herein described meets the objects of invention, and generally constitute a meritorious advance in the art unobvious to such a worker not having the benefit of these teachings.

Obviously, other modifications and variations of the present invention, not suggested above, are possible in the light of the above teachings, and, it is therefore understood that within the scope of the disclosed inventive concept, the invention may be practiced otherwise than specifically described.

What is claimed is:
1. In an underwater hydraulic system having a pressurized working fluid, an improved pressure regulator comprising:
   first cylinder means for confining a predetermined volume;
   first piston means having two faces and slidably retained within said first cylinder means for dividing said first cylinder into two compartments;
   duct means extending through one wall of said cylinder means and communicating with the exterior thereof for establishing ambient pressure on one face of said first piston means within one of compartment of said first cylinder means;
   a volume of low pressure gas confined within the second compartment of said first cylinder means for exerting a low pressure restorative force on the second face of said first piston means;
   second cylinder for confining a second predetermined volume;
   second piston means having two faces and slidably retained within said second cylinder means into two compartments;
   gas accumulator means effectively connected to said second cylinder means to expose one face of said second piston means to a high gas pressure;
   conduit means effectively connected to said second cylinder and for connection to the aforesaid underwater hydraulic system such as to expose the second face of said second piston means to the pressurized working fluid thereof; and
   rigid coupling means effectively joining the second face of said first piston means and the first face of said second piston means for unitary movement,
   whereby ambient pressure exerted on the first face of said first piston is coupled in an additive fashion to the second piston such that the pressurized working fluid has a pressure equal to the pressure of the gas accumulator means plus the ambient pressure.
2. A pressure regulator according to claim 1 in which said rigid coupling is a sealed rod.

* * * * *